(12) United States Patent
Dacosta

(10) Patent No.: US 8,745,208 B2
(45) Date of Patent: *Jun. 3, 2014

(54) METHOD FOR DATA SYNCHRONIZATION WITH MOBILE WIRELESS DEVICES

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,057

(22) Filed: Sep. 7, 2010

(65) Prior Publication Data

US 2011/0002343 A1 Jan. 6, 2011

Related U.S. Application Data

(63) Continuation of application No. 10/938,802, filed on Sep. 10, 2004, now Pat. No. 7,814,195.

(51) Int. Cl.
*G06F 15/173* (2006.01)
(52) U.S. Cl.
USPC .......................... 709/224; 709/225; 709/226
(58) Field of Classification Search
USPC .......................................... 370/428; 709/224
See application file for complete search history.

(56) References Cited

U.S. PATENT DOCUMENTS

| 5,790,952 | A | 8/1998 | Seaholtz et al. |
|---|---|---|---|
| 5,805,666 | A | 9/1998 | Ishizuka et al. |
| 6,151,491 | A | 11/2000 | Farris et al. |
| 6,246,875 | B1 * | 6/2001 | Seazholtz et al. .......... 455/432.1 |
| 6,252,868 | B1 | 6/2001 | Diachina et al. |
| 6,477,117 | B1 | 11/2002 | Narayanaswami et al. |
| 6,477,150 | B1 | 11/2002 | Meggenti et al. |

(Continued)

FOREIGN PATENT DOCUMENTS

| JP | 2002-152272 A | 5/2002 |
|---|---|---|
| JP | 2003-169015 A | 6/2003 |
| JP | 2003-309495 A | 10/2003 |
| WO | 2004003703 A3 | 1/2004 |

OTHER PUBLICATIONS

Notification of Reason(s) for Refusal, Japanese Patent Office, Patent Application No. 2007-531187, dispatched Dec. 20, 2010, translation (pp. 1-2) with claims (pp. 30-40); corresponds to PCT/US2005/029751 which corresponds to U.S. Appl. No. 11/202,581.

(Continued)

*Primary Examiner* — Umar Cheema
(74) *Attorney, Agent, or Firm* — John P. O'Banion

(57) ABSTRACT

A system and method for utilizing non-interactive communications with wireless networks for a mobile wireless device such as a telephone, personal digital assistant (PDA), laptop, or other mobile device configured for performing data transfers over a wireless network. By way of example, the invention allows a user to send and receive email as well as web updates and other data updates in physical areas and locations of limited signal coverage exists without the user periodically activating the device for updating data. The invention preferably comprises programming configured for awakening the processor in response to time thresholds or the detection of sufficient signal levels from available wireless networks and wireless network devices. The programming establishes a connection with appropriate wireless network devices and communicates selected data, for example data selected by the user, such as emails (to be sent/received), web sites to be refreshed, and other forms of non-interactive data.

42 Claims, 3 Drawing Sheets

(56) References Cited

U.S. PATENT DOCUMENTS

| | | | |
|---|---|---|---|
| 6,505,200 B1 | 1/2003 | Ims et al. | |
| 6,622,171 B2 | 9/2003 | Gupta et al. | |
| 6,654,410 B2 * | 11/2003 | Tzannes | 375/222 |
| 6,671,525 B2 | 12/2003 | Allen et al. | |
| 6,691,173 B2 | 2/2004 | Morris et al. | |
| 6,714,983 B1 | 3/2004 | Koenck et al. | |
| 6,735,434 B2 | 5/2004 | Criss et al. | |
| 6,741,836 B2 | 5/2004 | Lee et al. | |
| 6,760,772 B2 | 7/2004 | Zou et al. | |
| 6,802,035 B2 * | 10/2004 | Catreux et al. | 714/746 |
| 6,813,498 B1 | 11/2004 | Durga et al. | |
| 6,831,869 B2 | 12/2004 | Yamano | |
| 6,901,066 B1 | 5/2005 | Helgeson | |
| 6,950,684 B2 | 9/2005 | Goldberg | |
| 7,010,267 B2 | 3/2006 | Vanluijt et al. | |
| 7,027,773 B1 | 4/2006 | McMillin | |
| 7,054,646 B2 * | 5/2006 | Naghian | 455/456.1 |
| 7,130,616 B2 | 10/2006 | Janik | |
| 7,230,933 B2 | 6/2007 | Bahl et al. | |
| 7,249,291 B2 | 7/2007 | Rasmussen et al. | |
| 7,299,042 B2 | 11/2007 | Moore et al. | |
| 7,457,312 B2 | 11/2008 | Weiss et al. | |
| 7,477,890 B1 | 1/2009 | Narayanaswami | |
| 7,505,795 B1 * | 3/2009 | Lim et al. | 455/574 |
| 7,653,017 B2 * | 1/2010 | Huylebroeck | 370/311 |
| 7,685,606 B2 * | 3/2010 | Chang | 719/318 |
| 2002/0065939 A1 | 5/2002 | Liu | |
| 2002/0073170 A1 | 6/2002 | Hoffman et al. | |
| 2002/0078248 A1 | 6/2002 | Janik et al. | |
| 2002/0178279 A1 | 11/2002 | Janik et al. | |
| 2002/0184624 A1 | 12/2002 | Spencer | |
| 2003/0114204 A1 | 6/2003 | Allen et al. | |
| 2003/0115200 A1 | 6/2003 | Anthony et al. | |
| 2003/0119568 A1 | 6/2003 | Menard | |
| 2003/0140088 A1 | 7/2003 | Robinson et al. | |
| 2004/0005873 A1 | 1/2004 | Groenendaal et al. | |
| 2004/0009749 A1 | 1/2004 | Arazi et al. | |
| 2004/0018851 A1 | 1/2004 | Koenck et al. | |
| 2004/0078464 A1 | 4/2004 | Rajan et al. | |
| 2004/0131025 A1 | 7/2004 | Doehler et al. | |
| 2004/0154041 A1 | 8/2004 | Zhang | |
| 2004/0203998 A1 | 10/2004 | Knauerhase et al. | |
| 2005/0058153 A1 | 3/2005 | Santhoff et al. | |
| 2005/0138143 A1 | 6/2005 | Thompson | |
| 2005/0169201 A1 | 8/2005 | Huylebroeck | |
| 2005/0216951 A1 | 9/2005 | MacInnis | |
| 2005/0226201 A1 | 10/2005 | McMillin | |
| 2005/0255856 A1 | 11/2005 | Griffin et al. | |
| 2005/0256937 A1 | 11/2005 | Lewis | |
| 2006/0010472 A1 | 1/2006 | Godeny | |
| 2006/0047815 A1 | 3/2006 | Hamadi | |
| 2006/0056336 A1 | 3/2006 | Dacosta | |
| 2006/0069769 A1 | 3/2006 | Dacosta | |
| 2006/0277277 A1 | 12/2006 | Landschaft et al. | |
| 2007/0258508 A1 | 11/2007 | Werb et al. | |
| 2009/0049170 A1 | 2/2009 | Schick et al. | |

OTHER PUBLICATIONS

United States Patent and Trademark Office, International Search Report and Written Opinion, issued on Oct. 3, 2007 for corresponding International Patent Application No. PCT/US05/29751 (pp. 1-8) with claims searched (pp. 9-20) pp. 1-20; Please note that all references cited were previously submitted with the IDS filed on Nov. 29, 2010.

Korean Intellectual Property Office, Notice of Preliminary Rejection issued on Jan. 25, 2012, related South Korean patent application No. 10-2007-7005671, English translation (pp. 1-4), original Korean language copy (pp. 5-9), with claims (pp. 10-20), counterpart to PCT/US05/029751, claiming priority to U.S. Appl. No. 10/938,802, pp. 1-20.

Japanese Patent Office, Preliminary Notice of Grounds for Refusal, English translation (pp. 1-3) issued on Dec. 10, 2012 for corresponding Japanese Patent Application No. 2011-135964 with claims examined (pp. 4-8) and original Office Action in Japanese (pp. 9-12) pp. 1-12.

European Patent Office, Supplementary European Search Report issued on Nov. 24, 2011 (pp. 1-9), with claims (pp. 10-16), EP patent application No. 05789100.4, counterpart to PCT/US2005/029751, claiming priority to U.S. Appl. No. 10/938,802 and U.S. Appl. No. 11/202,581, pp. 1-16.

* cited by examiner

METHOD FOR DATA SYNCHRONIZATION WITH MOBILE WIRELESS DEVICES

CROSS-REFERENCE TO RELATED APPLICATIONS

This application is a continuation of U.S. patent application Ser. No. 10/938,802 filed on Sep. 10, 2004, now U.S. Pat. No. 7,814,195, incorporated herein by reference in its entirety.

This application is related to U.S. patent application Ser. No. 11/202,581 filed on Aug. 11, 2005, which is a continuation-in-part of U.S. patent application Ser. No. 10/938,802 filed on Sep. 10, 2004.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The invention pertains generally to mobile wireless data communications, and more particularly to non-interactive updating of data associated with a mobile wireless device through a network providing wireless connectivity.

2. Description of Related Art

The use of mobile wireless network devices continues on the rise, with network enabled cell phones, personal digital assistants (PDAs), laptop computers, in-vehicle information systems (i.e. On-Star™, map information, routing systems, taxi reservation systems), package carrier tablets (i.e. devices used for registering package receipt and delivery as well as typically collecting signatures), and other applications in which network connectivity is embedded within a portable device.

These mobile devices require access to network-based resources in order to retrieve or send electronic mail (email), collect information from other local or remote devices, or to link with other devices over the Internet to communicate information. However, due to the location of the mobile device in relation to the wireless service range and signal conditions, the user may not be able to connect to the network (i.e. Internet) at the desired time. In some cases the location of the wireless device is adequately covered by a provider, but not the provider with which the mobile device owner has an account.

For example, if a user has the mobile device with them at the beach or on an airplane they may be unable to retrieve their email, respond to email, send email, view the business page, or communicate data with remote devices.

Currently, users are required to wait until they are back within range of their own service provider equipment to perform the desired operations. As it is often difficult to know if areas have coverage, the user is left with a random hit-and-miss prospect of attempting to establish connectivity as they journey near the fringes of coverage as affected by geographical, infrastructure, and user positioning (i.e. in relation to buildings, structures, and terrain). Consequently, the user suffers from an adverse experience while sales of wireless devices can be impacted.

Accordingly, a need exists for a mobile network device and method which is configured to provide non-real-time wireless network access of non-interactive data. The present invention fulfills that need, as well as others, and overcomes drawbacks inherent with previous solutions.

BRIEF SUMMARY OF THE INVENTION

A system and method are described for providing non-real-time access to the Internet, or other networks, from a mobile device. The invention provides automated updating in which access is gained to perform non-interactive data exchange, such as to read and send email, update select web site information, update data to and from databases and perform additional remote connectivity related functionality, despite intermittent availability of wireless connectivity.

The system and method can be implemented on a wide variety of mobile electronic devices configured for providing wireless network access, including but not limited to: personal digital assistants, satellite communication links, laptop computers, cellular telephones, interactive watches, vehicular data systems and other wireless devices configured for accessing a network which could be inaccessible at a given time. Each of these electronic devices is configured with a transceiver configured for establishing wireless data connectivity and a means for non-interactively updating a selected range of data within a data repository (memory). The non-interactive updating is preferably performed from within a sleep mode, or low-power mode, in which device functionality is reduced to achieve reduced power consumption levels, such as when the device is not in use and being transported (i.e. lid closed on a PDA or cellular phone). Typically, the sleep mode is entered in response to a manual selection (i.e. buttons, device closure, device reconfiguration (shape change, engaged in storage position, etc.)), or may be less preferably entered automatically in response to detecting that the user has not been interacting with the device for a given period of time.

Programming for the network enabled mobile device is configured for automatically accessing a network, which provides wireless connectivity, to communicate data in a non-interactive, non-real-time, data exchange. Communication can be established with other wireless devices forming a peer-to-peer network, infrastructure network, or with local-area networks, or with wide-area networks such as the Internet. In this way emails and data are available to the user, although the information is less "timely" than information gathered in real-time. Furthermore, the device can non-interactively provide data over the network to update other devices, for example the sending of emails, database data, status changes, newly collected data, and so forth. The mobile device then attempts to establish wireless connectivity either periodically or in response to selected triggers (events), such as signal strength, changes in location, detection of favorable wireless signal conditions, detection of select wireless networks or service providers, and so forth. The unit is also preferably configured for obtaining wireless access through other carriers in exchange for a sufficient financial payment.

The non-interactive data to be communicated wirelessly may comprise any desired data that can be communicated over the wireless network without user intervention. The method is particularly well-suited for communicating electronic mail waiting to be sent, electronic mail awaiting download from the service provider, queries to be posted, responses to be collected, data to update, update data and web sites whose content is to be refreshed, and other forms of non-interactively sent or collected data.

In a preferred embodiment, the user establishes what accesses are to be performed in non-real-time. By way of example and not limitation, emails received, emails to be sent, specific web sites, information to be collected or sent are selected by the user for being kept updated in the background while the mobile device is in a sleep, or low-power, mode.

An embodiment of the invention may be described as an apparatus configured for providing mobile wireless data access to a network, comprising: (a) a wireless transceiver configured for establishing wireless data connectivity with a network; (b) a data repository configured for storing data to be sent or retrieved from the network; (c) means for automatically establishing, without user interaction, wireless connectivity; and (d) means for automatically communicating with the network, without user interaction, a selected range of data to, or from, the data repository.

The mobile wireless device (apparatus) is selected from the group of mobile wireless devices consisting essentially of: personal digital assistants, satellite communication links, laptop computers, cellular telephones, interactive watches, vehicle data systems, or other systems which provide wireless network capability and that can benefit from non-interactive updates. The data to be updated can be selected from the group of data consisting essentially of: electronic mail to be sent, electronic mail awaiting download from the network, queries to be posted, responses to be collected, data to update, update data, web sites whose content is to be refreshed, as well as other forms of data that can be non-interactively (automatically) communicated between the mobile device and the network to which wireless communication can be established.

The wireless data network may comprise any network configured for providing wireless network communication, including a wireless peer network, infrastructure network, a local network, or a wide area network such as the Internet. The establishing and communicating of data non-interactively is performed automatically upon awakening the apparatus from a sleep mode, or a low-power mode. Preferably after updating the device returns to sleep, or low power, mode.

An embodiment of the invention may also be described as an apparatus configured for providing mobile wireless data access to a network, comprising: (a) a transceiver configured for establishing wireless data connectivity with a network; (b) a computer configured for controlling the transceiver for communicating data to, or from, the network; (c) a memory coupled to the computer configured for storing data to be sent or retrieved from the network; (d) wherein the computer is configured with a sleep mode, or low-power operating mode, in which reduced functionality is provided at reduced power consumption levels; and (e) programming configured for execution on the computer for, (i) awakening from a sleep mode or low-power mode, (ii) establishing without user interaction wireless connectivity with the network for wireless data access, (iii) communicating with the network without user interaction a selected range of data to or from the memory.

An embodiment of the invention may also be described as an apparatus configured for providing mobile wireless data access to a network, comprising: (a) a transceiver configured for establishing wireless data connectivity with a peer network, local-area network, or wide-area network such as the Internet; (b) a computer configured for controlling the transceiver for communicating data to, or from, the network; (c) a memory coupled to the computer configured for storing data to be sent or retrieved from the network; (d) wherein the computer is configured with a sleep mode (or low-power operating mode), in which reduced functionality is provided at reduced power consumption levels; and (e) programming configured for execution on the computer for, (i) awakening from a sleep mode or low-power mode in response to a time threshold, or a detection of sufficient wireless signal intensity from a network, or a combination of time and signal conditions, (ii) establishing without additional user interaction wireless connectivity with the network for wireless data access, (iii) communicating with the network without additional user interaction a selected range of data to or from the memory including electronic mail to be sent, electronic mail to be downloaded, and web data to be updated, (iv) returning to a sleep mode after the communication is completed or the wireless connectivity is lost.

An embodiment of the invention may also be described as an improvement to a mobile electronics device that is configured for communicating data wirelessly with a network and incorporating a computer processor, memory, and programming for interactive data exchange with the network, with the improvement comprising: (a) a circuit configured for controlling a sleep mode or low-power operating mode in the computer processor of the device which reduces user interactive functionality at reduced power consumption levels; and (b) programming configured for execution on the computer for, (i) awakening from a sleep mode or low-power mode, (ii) establishing, without user interaction wireless connectivity with the network for wireless data access, (iii) communicating with the network without user interaction a selected range of data to or from the memory, (iv) returning to the sleep or low-power mode.

An embodiment of the invention may also be described as a method of non-interactive wireless access of network data by a mobile network enabled device, comprising: (a) selecting, on a mobile network enabled device, at least one access trigger to initiate a network access and non-interactive data to be communicated; (b) entering a sleep mode, or low-power operating mode, on the network enabled device; (c) awakening the mobile network enabled device in response to detection of the access trigger; (d) establishing connectivity over the network for communicating non-interactive data between the network enabled device and the network being accessed; (e) updating the selected non-interactive data on the network enabled device utilizing the network connectivity; and (f) returning to the sleep mode, or low-power operating mode.

It should be appreciated that the present invention provides a number of beneficial aspects including but not limited to the following.

An aspect of the invention is to provide updating of data associated with mobile wireless network devices that are subject to intermittent wireless access to a compatible network.

Another aspect of the invention is to provide a sleep mode, or low-power mode, from which from network communications are initiated in response to a time threshold, event threshold, or combination of time and event thresholds.

Another aspect of the invention is to provide a time threshold which comprises at least one set time or at least one set interval.

Another aspect of the invention is to provide an event threshold which is responsive to wireless access availability, such as by detecting if a sufficient network signal level exist for a compatible network.

Another aspect of the invention is to provide an event threshold in which the compatibility of a network can be determined in response to cost factors when connectivity is subject to additional charges.

Another aspect of the invention is to provide an updating mechanism that can be utilized with any mobile network device capable of supporting a sleep or low-power mode, such as personal digital assistants (PDAs), laptops, cellular phones, in-vehicle systems, package tablets and numerous other mobile devices.

Another aspect of the invention is to provide mobile device data updating in which the user can select the data range and depth to be updated.

Another aspect of the invention is to provide mobile device data updating in which the user can select the threshold conditions under which the device is to be activated from sleep mode to attempt network communication.

Another aspect of the invention is to provide mobile device updating in which the user can establish update parameters and an update list for controlling the update process.

Another aspect of the invention is to provide mobile device data updating in which the user can establish parameters for controlling under what conditions connectivity through other networks is to be established.

A still further aspect of the invention is to provide mechanisms for updating other devices and systems to the status or conditions to which a first device is subject, such as for updating a monitoring program to the routes of security guards or a number of other diverse purposes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
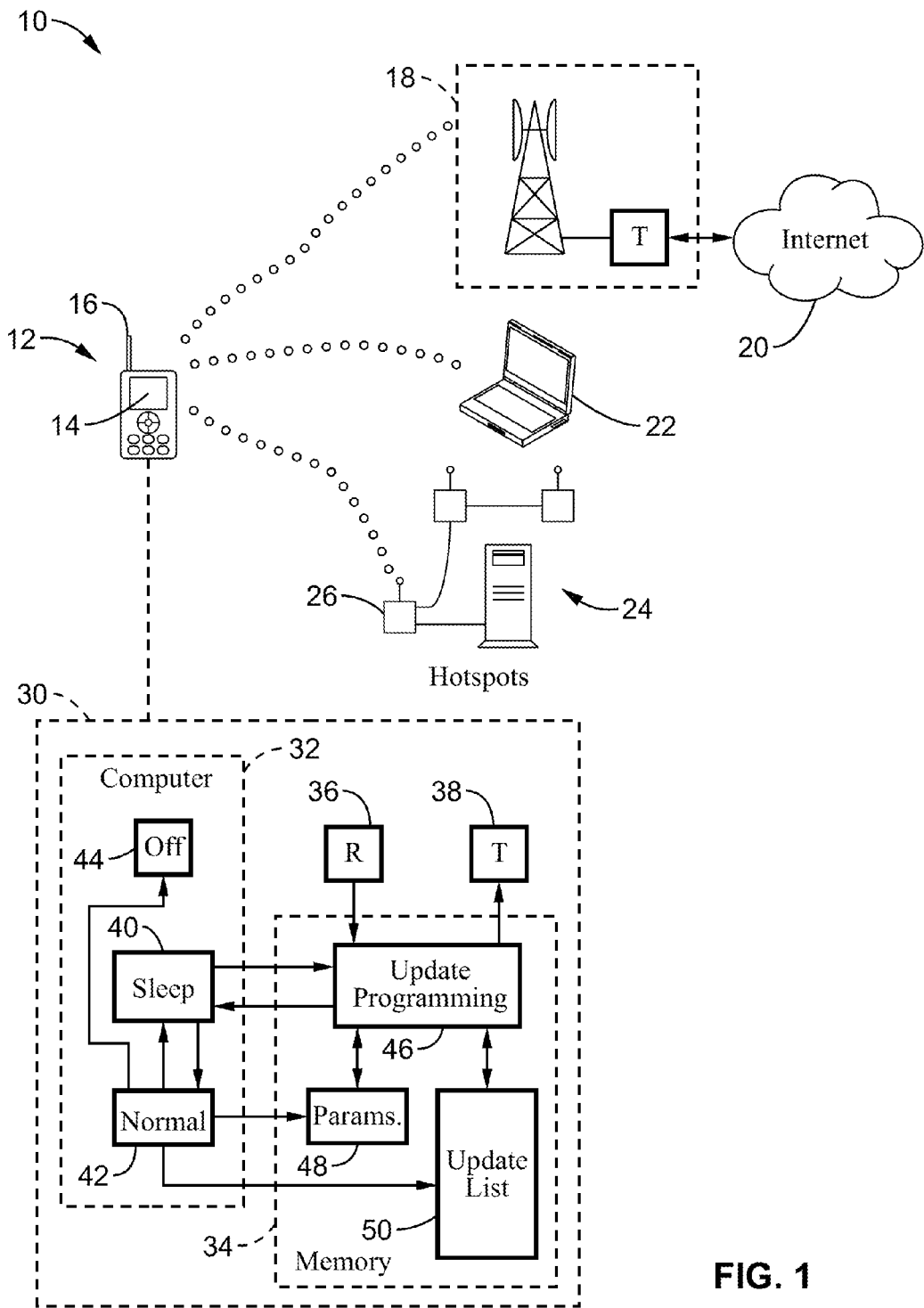
FIG. 1 is a block diagram of a mobile network enabled communications device according to an embodiment of the present invention, shown establishing non-interactive connectivity with various networks.
Figure 2:
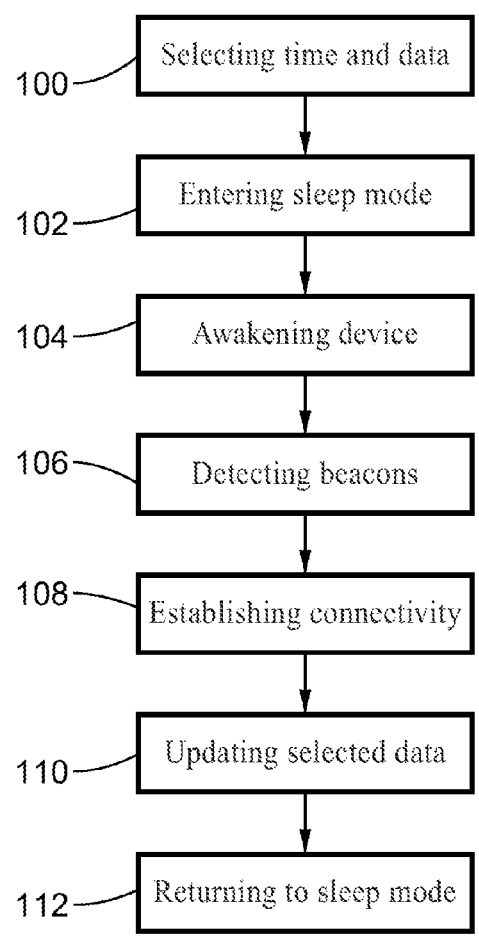
FIG. 2 is a flowchart of non-interactive network connectivity according to an embodiment of the present invention.
Figure 3:
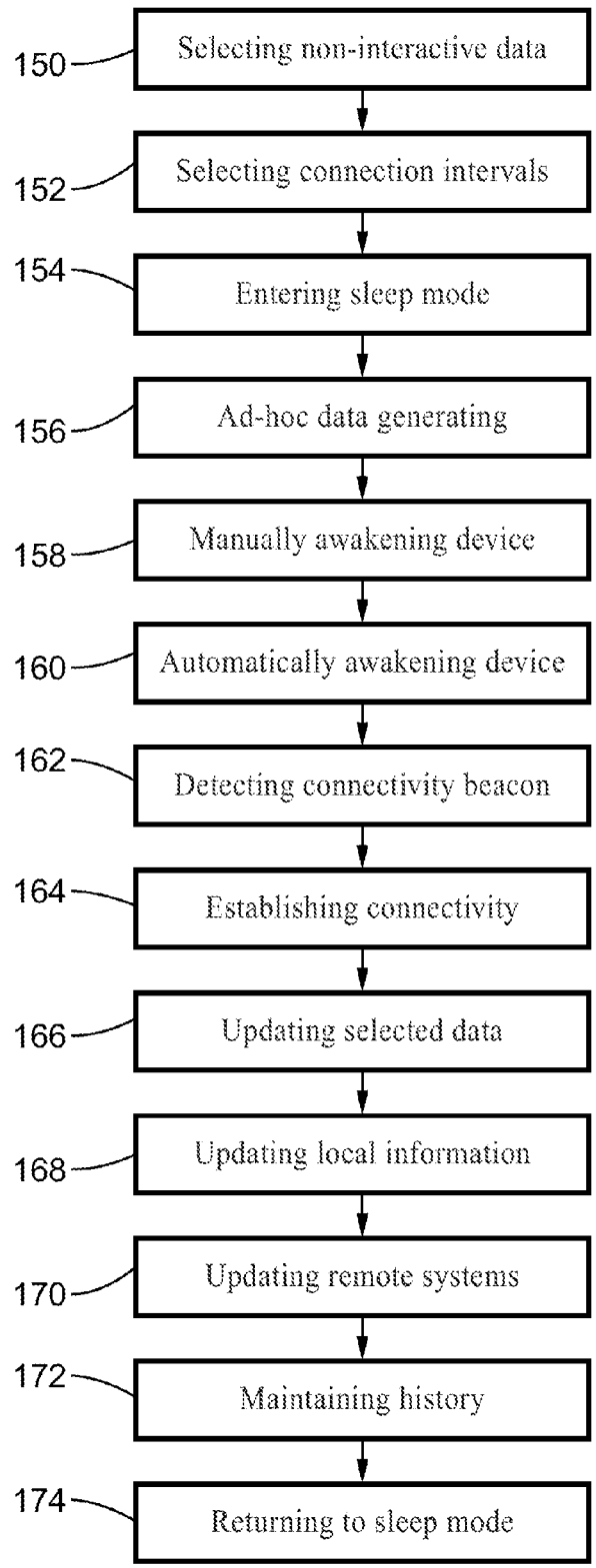
FIG. 3 is a flowchart of non-interactive network connectivity according to another embodiment of the present invention, showing the inclusion of optional aspects of the invention.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

FIG. 1 illustrates an embodiment 10 of a system configured according to the present invention. A device 12, depicted as a personal digital assistant (PDA), is shown configured with a user interface 14 along with a radio-frequency communication means, including antenna 16 for establishing wireless connectivity.

The wireless connectivity is configured for providing data access through wireless telephone infrastructures 18 to networks such as the Internet 20, directly to other devices 22 such as a laptop computer, as well as to wireless networking grids 24 having one or more hotspots 26, and other wireless communication channels.

The mobile wireless device 12 according to the invention is configured with circuitry 30 having a computer 32 and memory 34 as well as at least one wireless receiver 36 and wireless transmitter 38 (i.e. transceiver). It should be appreciated that wireless communication can be provided for one or more wireless standards, such as cellular wireless, WiFi (IEEE 802.11), WiMax (802.16), Bluetooth™, and so forth. The inclusion of multiple communication channels provides multiple mechanisms by which connectivity can be established.

Aspects of the invention are represented within computer block 32 and memory block 34. The computer is configured with a sleep mode 42, or alternatively another form of low-power mode, during which operation is at least substantially suspended to reduce power consumption. Typically, the device is configured for being utilized while in normal execution mode 42, or being turned off 44. A sleep mode 40 is utilized within processor 32 to allow the device to be activated in response to reaching a specific time, an elapsed time, an event condition or combination thereof. The device is configured to be awakened from sleep mode 40, wherein it can execute communication update programming 46 which controls utilization of receiver 36 and transmitter 38, if any wireless connectivity is available. If connectivity is available then a communication can be performed according to the update parameters 48 wherein a communication is established which updates the elements found in the update list 50. The update list preferably details both the web sites, or portions thereof, and depths to which updating is to be performed. It will be appreciated that aspects of the update parameters and update list can be established or changed by programming executing in normal mode, such as a front end for the update communications applications of the present invention.

It should be appreciated that the present invention can be implemented as a combination of hardware and software, or as software-only for execution on a mobile wireless device that is already configured to provide wireless connectivity as well as sleep or low-power operating states that can be overridden in response to time or event. Therefore, the present invention can be supplied as a computer-readable media (i.e. disk, memory card, USB memory device, etc.) which can be read and then executed by a particular mobile device.

One embodiment of the invention can be operated according to the following scenario, which by way of example considers the portable device to be a personal digital assistance (PDA). The following scenario generally describes establishing wireless connectivity over the Internet, however, it should be appreciated that wireless connectivity according to the present invention can be established directly with another device (i.e. updates performed between a laptop and PDA, and so forth), or through a proprietary wireless or wired network.

FIG. 2 illustrates an example embodiment of communications updating which generally depicts the primary aspects of the method. The user selects how the update is to be performed within the system, such as selecting time/event awakening and the data to be updated as represented by block 100. The data to be updated can comprise both breadth and depth selections providing significant user control of what data is to be updated. Preferably, the system is configured to allow the user to also indicate the hierarchy of updates, which can also be considered a priority. The user-interactive control of the update list and parameters of the invention are performed within an application that executes during normal operation of the device. After the user is finished utilizing the device in a normal operating mode the device is shut down in a manner wherein it will enter a sleep mode (or low-power mode) as depicted by block 102, such as closing the user interface of the device, without completely turning off the power. Alternatively, other methods may be utilized for selecting a sleep or reduced-power operating mode.

In response to time and/or event the device awakens from sleep mode as per block 104 and commences executing the update operation. Prior to establishing connectivity it is preferable that the unit attempts to detect the presence of signals, such as beacons, which indicate which forms of wireless connectivity may be available at the given location. This beacon detection is shown executed as block 106. After programming detects what is available it compares this against the update parameters and update list to determine, based on what needs updating, the type of connectivity to be established. Wireless connectivity is established as per block 108 after which the data listed in the update list, or a portion thereof, is updated using the established connection. After all desired updates have been performed, insofar as the connectivity is still available, the programming returns the device to a sleep mode as per block 112.

FIG. 3 illustrates an embodiment of the updating method according to the present invention which includes additional details and a number of optional features which can be incorporated separately or in various combinations.

As represented in block 150 the update communications application according to the invention is configured for interacting with the user for selecting non-interactive data to be communicated. The control application for the non-real-time updates establishes what data is to be communicated automatically during the time the PDA is retained in sleep mode. The breadth and depth of updating can be user selected. Optional mechanisms can be provided wherein the device programming automatically determines possible update targets, such as in response to historical use of the device. In another option the elements to be updated may be selected in a hierarchical order, so that in response to intermittent connections it is assured that the most important information is communicated first, prior to a loss of connection. For some data, such as web sites, the breadth and depth of updates should be selected.

By way of example, a user may want updates on the business page of a news site including a stock market update. They may specifically request access to all new technical articles in that business section. The user therefore can establish the breadth and depth of what is to be maintained. In addition, the content selection can also be optionally marked according to priority, so that the system can determine which content is worthy of being communicated if intermittent connection exist or if connect charges are applicable, such as for other carriers.

As mentioned above, device programming can be optionally configured for monitoring user accesses to web sites and creating a hierarchy of importance that could be selected by the user. Preferably the device is configured to allow the user to edit the list, and to add indices into the list according to importance (i.e. highest, medium, and background).

In block 152 the programming is configured to allow user selection of times, intervals, or events during which update communications are to be attempted. For example, the control application interacts with the user to select the interval (i.e. in increments of minutes, tens of minutes, half hours, and so forth), at which updates and synchronization are to be performed with the Internet based resources. In this example, the user may select two hours as the update interval. Optionally, the intervals (periods) can be made contingent upon specific times (i.e. on the hour, half-hour, etc.) connection availability, event occurrence, time since last connection was established, or other parameters. Typically, a default pattern for the time/event specifier can be established by the user, so that the device is kept up to date when non-real-time mode is activated. Optionally, the user can select special modes of activity, for example selecting under what circumstances connectivity with other carriers is to be established which may incur additional charges. For less important communications needs, the device allows the user to establish connectivity parameters based on connect time charges and the like, wherein less important data subject to little change, such as web sites, are collected during non-peak times.

In block 154 the programming is configured to allow the user to select data to be immediately updated, for example generating data to be sent such as an electronic mail message (email). Execution of certain applications, such as email composition applications, can increase the amount of data to be updated when connectivity becomes available. It should be appreciated that connectivity may not be available at the time the email is created, wherein the programming is preferably configured to flag the email for sending during the automated data update process. Incoming data could also be required, in particular when utilizing certain applications that rely on web based data (i.e. XML, and so forth), or data otherwise retrieved directly or indirectly from other systems utilizing the wireless connectivity.

Aside from email composition applications it should be noted that a number of applications can be executed that otherwise create or determine data that is to be sent out over the wireless connectivity. The programming can be configured as a default, or in response to user input, for marking created data for immediate sending even if no connectivity is presently available. Device programming subsequently automatically establishes connectivity as soon as a connection is detected over which the data can be sent out.

In block 156 programming and/or user activity direct the device to enter sleep mode. For example the user may close the lid of the device, such as PDA, or otherwise select a sleep mode without powering off the mobile device. If a sleep mode synchronization was selected by the user the timer circuit continues to operate to awaken the device periodically, and/or in response to triggers (events), such as in response to signal strength, connection availability, user key input or combination, and so forth.

In block 158 programming is shown detecting manual awakening of the device by the user. This is an option in which device programming can respond to selected user input which "overrides" the periodic awakening sequence so that a connection attempt is made immediately. The device need not be triggered into a normal operating mode, but can be utilized to allow the user to intervene in selected possibly appropriate times for establishing connectivity.

The manual awakening, for instance, may be performed by a traveling user when they believe their location has an increased probability of connectivity. Examples include a user that has walked outdoors on a break away from signal attenuating structures, a driver stopping near the crest of a hill, or getting out away from a city, and a number of other scenarios in which the conditions have changed or the urgency has changed in updating the information, including the sending and receiving of electronic mail.

For example, the programming is preferably configured to be awakened from sleep mode in response to a selected button press or combination of button presses. Once awakened, the device attempts to establish wireless connectivity for communicating the desired non-interactive data as previously established by the user. After the updating operation is performed the unit can return to sleep mode. It will be appreciated that the programming is preferably configured so that in response to a successful update triggered by a manual operation, the timing of automated time-based awakening is reset.

In block 160 the programming is configured to automatically awaken the device based on time or events. In one mode the device awakens periodically, such as every two hours in this scenario. Alternatively, or additionally, the device can be awakened when conditions appear conducive to the establishment of a connection, such as based on signal strength, beacons, and so forth.

In block 162 the programming can determine if wireless connectivity is available, and preferably what types of wireless connectivity is available. This is preferably performed by detecting the presence of beacons which determine if wireless connectivity exists while signal strength and parameters of the beacons indicate which forms of wireless connectivity can be established. Furthermore, the communication routines can interact with available networks if additional information is necessary about the network. For example the receiver circuitry may be activated every two hours for detecting what wireless connectivity can be established. A check is performed to determine if the beacon corresponds to a service provider with which the user may successfully communicate, such as being able to connect through a primary service provider of the user, a WiFi hotspot, a direct connection with a related user device, or another service provider which may require the payment of fees in order to utilize the communications channel.

In block 164 connectivity is established for performing the update. In one embodiment of the invention, based on the update parameter settings the programming determines which of the available connectivity options provides the least cost service to satisfy (at least) the most important of the required updating. Preferably, service is available by the service provider of the user, however, in other cases the system determines if connectivity should be established using alternative services, such as those requiring additional per minute charges. Additionally, the extent of non-interactive data to be communicated is selected based on user established preferences, so that connectivity is not to be paid for when the data is not very important, such as updating of non-priority web sites. If alternative connectivity is available on a per time basis (i.e. minute or second) then a financial transaction can be initiated such as using telephone payment infrastructure, an internet payment service, credit card, or other means of paying for the connectivity.

In block 166 updating is performed over the established communications link with data being input or output according to the update list and a default, or user defined, hierarchy. For example a hierarchy may order updates as: sending outgoing emails, retrieving incoming emails (i.e. from selected parties, non-Spam, without attachment, or based on other selection criterion), high importance data synchronization is performed (i.e. contact database or other corporate information), and content from selected web sites is updated, such as new feeds, industry information, blogs and the like.

The types of communication and synchronization are performed in response to the types of connection established and the type of service provider. For example, if the present link is a low-rate GPRS wireless link, device programming may elect to only transmit outgoing email. However, if the link is a high data rate WiFi link, the PDA may choose to synchronize all content including video content. If the WiFi link is a "free" link without confidentiality (WEP-type privacy), VPN, or a secure website, device programming according to the invention can choose to restrict downloading to non-proprietary content, such as updating of selected web sites (i.e. news feeds and the like).

The update list is changed to indicate the status of each of the update items, along with preferably the time the update was performed. The programming is preferably configured to alert the user to these updates, or more preferably the user is only alerted to updates that they have marked for generating an alert when configuring the update list, in response to an update being performed which retrieves different content.

Once important communications have taken place, any accelerated updates automatically revert back to default conditions in which normal periodic updates are attempted.

In block 168 an optional process of updating local information can be performed. In this mode of the invention, device programming in response to detecting the presence of local connectivity, such as WiFi "hot spots", automatically performs downloads of selected content, such as maps, alerts, weather, local news, announcements, closures (i.e. ride availability at a theme park), sales, and so forth. It will be appreciated that a standardized hierarchy would be preferably established for "hot spots" with regard to the structuring and categorization of data configured for being automatically disseminated wirelessly, wherein the collection of local data can be well-controlled and seamless as the user traverses different networks containing hot spots.

In block 170 an optional process is depicted for updating remote systems. The device programming in this case optionally updates remote systems to status relating to the mobile device, or the associated user. For example, the location and/or track path of an individual such as a security guard making his rounds, or an individual on parole whose whereabouts are being monitored as part of a condition for release. By way of further example the device can communicate the vital statistics of a patient, or changes thereof, in response data collected from one or more sensors attached to the mobile device.

In block 172 an optional process is depicted in which the programming is configured for maintaining a history of wireless communication updates (logging), along with durations and connect time charges for review by the user. This aids the user in making intelligent decisions with regard to how timely the communications are to be performed.

In block 174 the programming has completed the update process, or the link is no longer available, wherein a return to sleep mode (or other low-power mode) of the device is provided. Prior to entering sleep mode again, internal timing for any ongoing connectivity attempts, such as future updates, are established.

It should be appreciated that duration of a sleep period can be set by the programming to take into account the elapsed time since the previous update was performed. For example, if connectivity has not been available for three hours even though the timer is set for two hours, then the unit more frequently checks for availability of connectivity.

The present invention describes a method and system for performing non-real-time data updates over a wireless connection to a network. A number of novel aspects of the invention are disclosed which may be practiced separately or in various combinations without departing from the teachings of the present invention. It will be appreciated that implementation of certain aspects of the invention would be known to one of ordinary skill in the art, wherein these implementation details have been typically omitted herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus configured for providing mobile wireless data access to a network, comprising:
   a computer processor;
   a wireless transceiver configured for establishing wireless data connectivity with a network;
   a data repository configured for storing data to be sent or retrieved from the network;
   a plurality of update parameters stored within the data repository;
   wherein said update parameters are set by a user when said apparatus is in normal operating mode to establish target non-interactive data within a plurality of potential targets within a selected range of data associated with an application being executed on said processor;
   wherein said non-interactive target data comprises data to be sent or received from said data repository when said apparatus is in a shut-down mode; and
   programming executable on said processor for:
      automatically establishing, without user interaction, wireless connectivity;
      automatically communicating with the network, without user interaction, a selected range of data to, or from, said data repository; and
      automatically updating the selected range of data based on one or more of the update parameters.

2. An apparatus as recited in claim 1, wherein said apparatus is selected from the group of mobile wireless devices consisting essentially of: personal digital assistants, satellite communication links, laptop computers, cellular telephones, interactive watches, package carrier tablets and vehicular data systems.

3. An apparatus as recited in claim 1, wherein said selected range of data is selected from the group of data consisting of: electronic mail to be sent, electronic mail awaiting download from the network, and web sites whose content is to be refreshed.

4. An apparatus as recited in claim 1, wherein said wireless data network comprises a wireless peer network, a local network, a wide area network, or the Internet.

5. An apparatus as recited in claim 1, wherein said automatic establishing, communicating and updating is performed upon awakening the apparatus from a sleep mode, or low-power mode.

6. An apparatus as recited in claim 5, wherein said apparatus is returned to said sleep or low-power mode, therein deactivating said wireless transceiver, after communication and updating of the selected range of data has been performed.

7. An apparatus as recited in claim 5, wherein said apparatus is awakened from sleep or low-power mode in response to reaching a time threshold, detecting favorable wireless signal conditions, or a combination of both.

8. An apparatus configured for providing mobile wireless data access to a network, comprising:
   a transceiver configured for establishing wireless data connectivity with a network;
   a computer configured for controlling said transceiver for communicating data to or from the network;
   a memory coupled to said computer configured for storing data to be sent or retrieved from the network;
   wherein said computer is configured with a sleep mode-in which reduced functionality is provided at reduced power consumption levels; and
   programming configured for execution on said computer for:
      setting of update parameters by a user when said apparatus is in a normal operating mode to establish target non-interactive data within a plurality of potential targets within a selected range of data associated with an application being executed on said processor;
      wherein said non-interactive target data comprises data to be sent or received from said memory when said apparatus is in a shut-down mode which is not user interactive;
      awakening from a sleep mode;
      establishing, without user interaction, wireless connectivity with the network for wireless data access;
      communicating with the network, without user interaction, a selected range of data to, or from, said memory; and
      updating the selected range of data based on one or more of the update parameters stored in said memory.

9. An apparatus as recited in claim 8, wherein said apparatus is selected from the group of mobile wireless devices consisting essentially of: personal digital assistants, satellite communication links, laptop computers, cellular telephones, interactive watches, package carrier tablets and vehicular data systems.

10. An apparatus as recited in claim 8, wherein said selected range of data is selected from the group of data consisting of: electronic mail to be sent, electronic mail awaiting download from the network, and web sites whose content is to be refreshed.

11. An apparatus as recited in claim 9, wherein said wireless data network comprises a wireless peer network coupling said apparatus directly to another apparatus.

12. An apparatus as recited in claim 9, wherein said wireless data network comprises a local or wide area network having at least one wireless communication node.

13. An apparatus as recited in claim 12, wherein said wireless data network comprises the Internet.

14. An apparatus as recited in claim 9, wherein said sleep mode is entered manually or automatically when limited user interaction with the apparatus is expected.

15. An apparatus as recited in claim 14, further comprising programming configured for awakening the apparatus from a sleep mode, in response to detecting a time threshold, event threshold, or a combination of time and event thresholds and updating the selected range of data based on one or more of the update parameters.

16. An apparatus as recited in claim 15, wherein said apparatus is returned to said sleep mode, therein deactivating said wireless transceiver, after communication and updating of the selected range of data has been performed.

17. An apparatus as recited in claim 15, wherein said time threshold comprises at least one predetermined time, or one or more periodic intervals.

18. An apparatus as recited in claim 15, wherein said event threshold comprises detecting the presence of sufficient signal strength with a wireless network that is capable of supporting wireless data communication from the apparatus.

19. An apparatus as recited in claim 18, wherein said event threshold further comprises determining which wireless network to establish connectivity if multiple wireless networks can support wireless data communication from the apparatus.

20. An apparatus as recited in claim 9, further comprising a user interface configured for supporting user interaction with the apparatus.

21. An apparatus as recited in claim 20, wherein said user interface is configured for establishing the data to be communicated with the network when the computer is awakened.

22. An apparatus as recited in claim 21, wherein said user interface is configured for establishing a time threshold, event threshold, or a combination threshold for awakening of said computer.

23. An apparatus configured for providing mobile wireless data access to a network, comprising:
 a transceiver configured for establishing wireless data connectivity with a peer network, local-area network, wide-area network, or Internet;
 a computer configured for controlling said transceiver for communicating data to, or from, the network;
 a memory coupled to said computer configured for storing data to be sent or retrieved from the network;
 wherein said computer is configured with a sleep mode, or low-power operating mode, in which reduced functionality is provided at reduced power consumption levels; and
 programming configured for execution on said computer for:
  setting of update parameters by a user when said apparatus is in a normal operating mode to establish target non-interactive data within a plurality of potential targets within a selected range of data associated with an application being executed on said processor;
  wherein said non-interactive target data comprises data to be sent or received from said memory when said apparatus is in a shut-down mode which is not user interactive;
  awakening from a sleep mode, or low-power mode, in response to a time threshold, a detection of sufficient wireless signal intensity from a network, or a combination of both;
  establishing, without additional user interaction, wireless connectivity with the network for wireless data access;
  communicating with the network, without additional user interaction, a selected range of data to, or from, said memory including electronic mail to be sent, electronic mail to be downloaded, and web data to be updated, updated; and
  returning to a sleep or low power mode, therein deactivating said wireless transceiver, after said communication is completed or the wireless connectivity is lost.

24. An apparatus as recited in claim 23, wherein said apparatus is selected from the group of mobile wireless devices consisting essentially of: personal digital assistants, satellite communication links, laptop computers, cellular telephones, interactive watches, package carrier tablets and vehicular data systems.

25. An apparatus as recited in claim 23, wherein said range of data can be selected from the group of data consisting essentially of: electronic mail to be sent, electronic mail awaiting download from the network, queries to be posted, responses to be collected, data to update, update data and web sites whose content is to be refreshed.

26. An apparatus as recited in claim 23:
 wherein said sleep mode, or low-power mode, is entered manually in response to user input, device closure, or device reconfiguration; and
 wherein said sleep mode, or low-power mode, is entered automatically in response to detecting limited user interaction with the apparatus.

27. A mobile electronics device configured for communicating data wirelessly with a network and incorporating a computer processor, memory, and programming for interactive data exchange with the network, comprising:
 a circuit configured for controlling a sleep mode, or low-power operating mode, in the computer processor of the device which reduces user interactive functionality at reduced power consumption levels; and
 programming configured for execution on said computer for;
 setting of update parameters by a user when said apparatus is in a normal operating mode to establish target non-interactive data within a plurality of potential targets within a selected range of data associated with an application being executed on said processor;
 wherein said non-interactive target data comprises data to be sent or received from said memory when said apparatus is in a shut-down mode which is not user interactive;
 awakening from a sleep mode, or low-power mode;
 establishing, without user interaction, wireless connectivity with the network for wireless data access;
 communicating with the network, without user interaction, a selected range of data to, or from, said memory;
 updating the selected range of data based on one or more of the update parameters stored in said memory when said apparatus periodically awakens from sleep mode; and
 returning to said sleep mode, or said low-power mode.

28. The device as recited in claim 27, wherein said electronics device is selected from the group of mobile wireless devices consisting essentially of: personal digital assistants, satellite communication links, laptop computers, cellular telephones, interactive watches, package carrier tablets and vehicular data systems.

29. The device as recited in claim 27, wherein said selected range of data can be selected from the group of data consisting essentially of: electronic mail to be sent, electronic mail awaiting download from the network, queries to be posted, responses to be collected, data to update, update data and web sites whose content is to be refreshed.

30. The device as recited in claim 27, wherein said wireless data network comprises a wireless peer network coupling said apparatus directly to another apparatus, a local or wide area network having at least one wireless communication node, or the Internet.

31. The device as recited in claim 27, wherein said apparatus is awakened from sleep or low-power mode in response to reaching a time threshold, detecting favorable wireless signal conditions, or a combination of both.

32. A method of non-interactive wireless access of network data by a mobile network enabled device, comprising:
    (a) selecting, on a mobile network enabled device, at least one access trigger to initiate a network access and non-interactive data to be communicated and user setting of update parameters when said apparatus is in normal operating mode to establish target non-interactive data within a plurality of potential targets within a selected range of data associated with an application being executed on said processor, wherein said non-interactive target data comprises data to be sent or received from said memory when said apparatus is in a sleep or low power mode which is not user interactive;
    (b) entering a sleep mode, or low-power operating mode, on the network enabled device;
    (c) awakening the mobile network enabled device in response to detection of said access trigger;
    (d) establishing connectivity over the network for communicating non-interactive data between said network enabled device and the network being accessed;
    (e) updating said selected non-interactive data on said network enabled device utilizing said network connectivity; and
    (f) returning to said sleep mode, or low-power operating mode.

33. A method as recited in claim 32, further comprising:
detecting beacons prior to establishing said connectivity over the network;
said beacons indicating wireless connectivity; and
comparing said indicated wireless connectivity against the at least one update parameter to determine the type of connectivity to be established.

34. A method as recited in claim 32, further comprising maintaining a history of non-interactive data communications with the network.

35. A method as recited in claim 32, further comprising updating remote systems with data collected by the mobile network enabled device.

36. A method as recited in claim 32, further comprising:
an update list detailing a data range and depths to be updated;
wherein updating said selected non-interactive data comprises updating the non-interactive data according to the at least one update parameter land the update list.

37. A method as recited in claim 32, wherein said access trigger comprises a time threshold and/or is performed in response to detecting signal strength of received beacons which indicate that wireless connectivity should exist, while parameters of the beacons indicate which forms of wireless connectivity can be established.

38. An apparatus as recited in claim 1:
wherein the target non-interactive data comprises a plurality of content targets; and
wherein the plurality of content targets are prioritized in hierarchical order for transmission according to said hierarchical order.

39. An apparatus as recited in claim 8:
wherein the target non-interactive data comprises a plurality of content targets; and
wherein the plurality of content targets are prioritized in hierarchical order for transmission according to said hierarchical order.

40. An apparatus as recited in claim 23:
wherein the target non-interactive data comprises a plurality of content targets; and
wherein the plurality of content targets are prioritized in hierarchical order for transmission according to said hierarchical order.

41. A device as recited in claim 27:
wherein the target non-interactive data comprises a plurality of content targets; and
wherein the plurality of content targets are prioritized in hierarchical order for transmission according to said hierarchical order.

42. A method as recited in claim 32:
wherein the target non-interactive data comprises a plurality of content targets; and
wherein the plurality of content targets are prioritized in hierarchical order for transmission according to said hierarchical order.

* * * * *